US012676703B2

(12) United States Patent
Bhamri et al.

(10) Patent No.: US 12,676,703 B2
(45) Date of Patent: Jul. 7, 2026

(54) UCI REPETITIONS MULTIPLEXING ON PUSCH

(71) Applicant: Lenovo (Singapore) Pte. Ltd., New Tech Park (SG)

(72) Inventors: Ankit Bhamri, Rödermark (DE); Hossein Bagheri, Urbana, IL (US); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 448 days.

(21) Appl. No.: 18/250,341

(22) PCT Filed: Oct. 25, 2021

(86) PCT No.: PCT/IB2021/059838
§ 371 (c)(1),
(2) Date: Apr. 24, 2023

(87) PCT Pub. No.: WO2022/084972
PCT Pub. Date: Apr. 28, 2022

(65) Prior Publication Data
US 2023/0412324 A1 Dec. 21, 2023

Related U.S. Application Data

(60) Provisional application No. 63/105,065, filed on Oct. 23, 2020.

(51) Int. Cl.
*H04W 72/02* (2009.01)
*H04L 1/1829* (2023.01)
(Continued)

(52) U.S. Cl.
CPC ............ *H04L 1/189* (2013.01); *H04L 1/1854* (2013.01); *H04L 1/1858* (2013.01); *H04W 72/21* (2023.01)

(58) Field of Classification Search
CPC . H04W 72/02; H04W 72/04; H04W 72/0446; H04W 72/121; H04W 72/23;
(Continued)

(56) References Cited

U.S. PATENT DOCUMENTS

2020/0259625 A1 8/2020 Papasakellariou
2020/0329486 A1 10/2020 Yang et al.
(Continued)

OTHER PUBLICATIONS

PCT/IB2021/059838, "Notification of Transmittal of the International Search Report and the Written Opinion of the International Searching Authority, or the Declaration", International Searching Authority, Jan. 31, 2022, pp. 1-13.
(Continued)

*Primary Examiner* — Bo Hui A Zhu
(74) *Attorney, Agent, or Firm* — Kunzler Needham Hilton

(57) ABSTRACT

Apparatuses, methods, and systems are disclosed for UCI repetitions multiplexing on PUSCH. An apparatus includes a transceiver that receives an indication comprising at least a beta-offset value and multiplexing of a plurality of repetitions of uplink control information ("UCI") on a single transmission occasion of physical uplink shared channel ("PUSCH"). The transceiver receives a configuration to determine a starting symbol index and a maximum number of symbols for each of the plurality of repetitions of UCI on PUSCH. The apparatus includes a processor that multiplexes UCI on PUSCH for transmitting UCI to a node of a mobile wireless communication network based on the starting symbol index and the maximum number of symbols for each of the plurality of repetitions according to an indicated beta-offset value.

20 Claims, 6 Drawing Sheets

(51) Int. Cl.
  *H04L 1/1867* (2023.01)
  *H04W 72/21* (2023.01)

(58) Field of Classification Search
  CPC ..... H04W 72/50; H04W 72/51; H04W 72/52;
      H04W 72/53; H04W 72/54; H04W
      72/541; H04W 72/542; H04W 72/543;
      H04W 72/56
  See application file for complete search history.

(56) References Cited

U.S. PATENT DOCUMENTS

2023/0379923 A1* 11/2023 Rastegardoost .......... H04L 1/08
2024/0015748 A1* 1/2024 Kittichokechai ......... H04L 1/08

OTHER PUBLICATIONS

CATT, "Remaining issues on PUSCH enhancements", 3GPP TSG
RAN WG1 #100bis R1-2002084, Apr. 10-30, 2020, pp. 1-19.

Nokia, "Feature lead summary #3 on HARQ-ACK feedback enhancements for NR Rel-17 URLLC/IIoT (AI 8.3.1.1)", 3GPP TSG-RAN WG1 Meeting #102-e R1-2007216, Aug. 17-28, 2020, pp. 1-101.
Nokia et al., "New WID on enhanced Industrial Internet of Things (IoT) and URLLC support", 3GPP TSG RAN Meeting #86 RP-193233, Dec. 9-12, 2019, pp. 1-5.
Nokia et al., "Revised WID: Enhanced Industrial Internet of Things (IoT) and ultra-reliable and low latency communication (URLLC) support for NR", 3GPP TSG RAN Meeting #88e RP-201310, Jun. 29-Jul. 3, 2020, pp. 1-6.
3GPP, "3rd Generation Partnership Project; Technical Specification Group Radio Access Network; NR; Multiplexing and channel coding (Release 16)", 3GPP TS 38.212 V16.2.0, Jun. 2020, pp. 1-151.
3GPP, "3rd Generation Partnership Project; Technical Specification Group Radio Access Network; NR; Physical layer procedures for control (Release 16)", 3GPP TS 38.213 V16.2.0, Jun. 2020, pp. 1-176.

\* cited by examiner

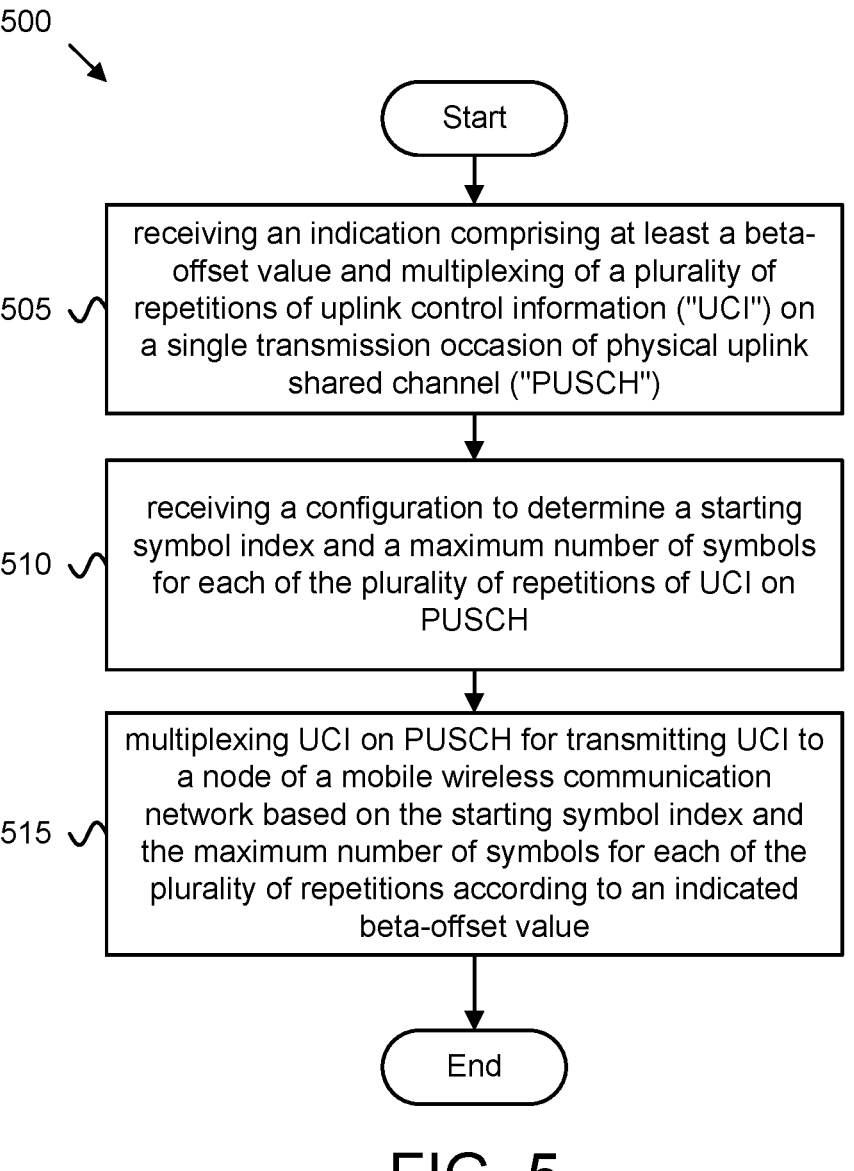

500

Start 505 receiving an indication comprising at least a beta-offset value and multiplexing of a plurality of repetitions of uplink control information ("UCI") on a single transmission occasion of physical uplink shared channel ("PUSCH")

510 receiving a configuration to determine a starting symbol index and a maximum number of symbols for each of the plurality of repetitions of UCI on PUSCH 515 multiplexing UCI on PUSCH for transmitting UCI to a node of a mobile wireless communication network based on the starting symbol index and the maximum number of symbols for each of the plurality of repetitions according to an indicated beta-offset value End

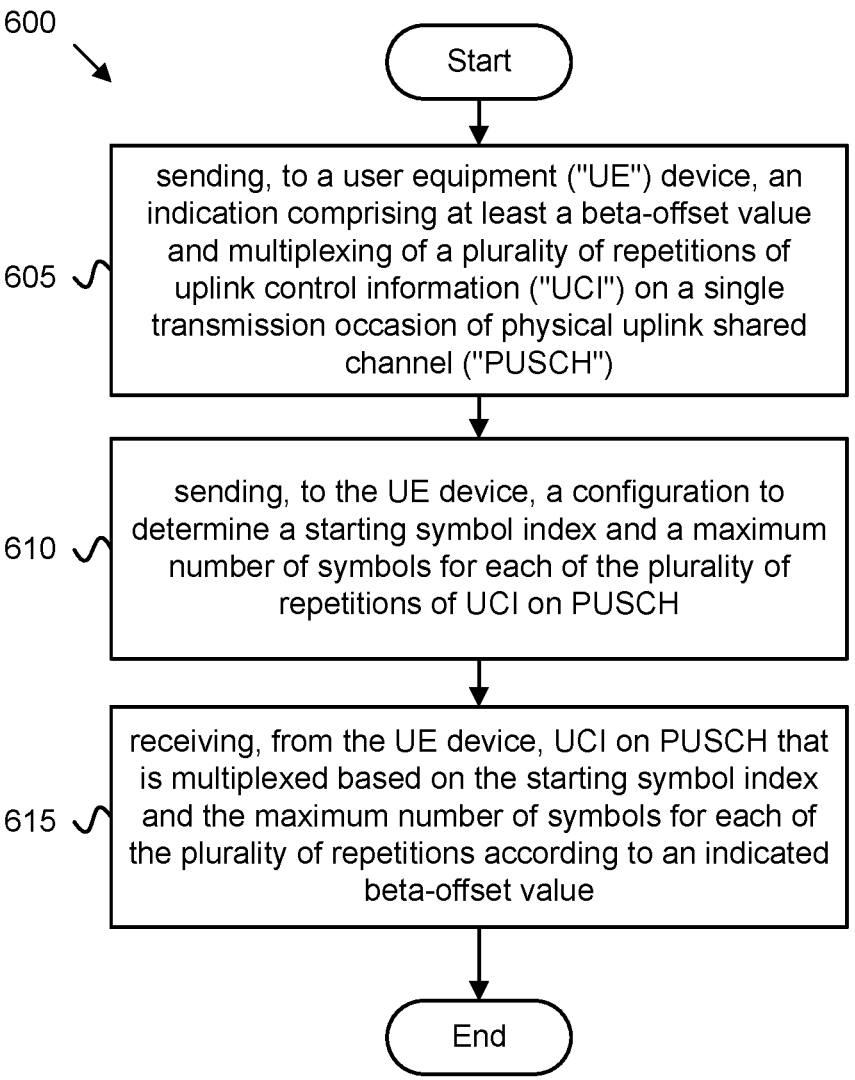

Start

605 — sending, to a user equipment ("UE") device, an indication comprising at least a beta-offset value and multiplexing of a plurality of repetitions of uplink control information ("UCI") on a single transmission occasion of physical uplink shared channel ("PUSCH")

610 — sending, to the UE device, a configuration to determine a starting symbol index and a maximum number of symbols for each of the plurality of repetitions of UCI on PUSCH 615 — receiving, from the UE device, UCI on PUSCH that is multiplexed based on the starting symbol index and the maximum number of symbols for each of the plurality of repetitions according to an indicated beta-offset value End

FIG. 6

UCI REPETITIONS MULTIPLEXING ON PUSCH

CROSS-REFERENCES TO RELATED APPLICATIONS

This application claims priority to U.S. Provisional Patent Application No. 63/105,065 entitled "UCI REPETITIONS MULTIPLEXING ON PUSCH" and filed on Oct. 23, 2020, for Ankit Bhamri et al., which is incorporated herein by reference in its entirety.

FIELD

The subject matter disclosed herein relates generally to wireless communications and more particularly relates to UCI repetitions multiplexing on PUSCH.

BACKGROUND

In wireless networks, there is a distinction between low- and high-priority uplink control information ("UCI"). Multiplexing a high-priority UCI with a low-priority UCI may introduce reliability and latency issues.

BRIEF SUMMARY

Disclosed are procedures for UCI repetitions multiplexing on PUSCH. Said procedures may be implemented by apparatus, systems, methods, and/or computer program products. In one embodiment, an apparatus includes a transceiver that receives an indication comprising at least a beta-offset value and multiplexing of a plurality of repetitions of uplink control information ("UCI") on a single transmission occasion of physical uplink shared channel ("PUSCH"). In one embodiment, the transceiver receives a configuration to determine a starting symbol index and a maximum number of symbols for each of the plurality of repetitions of UCI on PUSCH. In one embodiment, the apparatus includes a processor that multiplexes UCI on PUSCH for transmitting UCI to a node of a mobile wireless communication network based on the starting symbol index and the maximum number of symbols for each of the plurality of repetitions according to an indicated beta-offset value.

In one embodiment, a method includes receiving an indication comprising at least a beta-offset value and multiplexing of a plurality of repetitions of uplink control information ("UCI") on a single transmission occasion of physical uplink shared channel ("PUSCH"). In one embodiment, the method includes receiving a configuration to determine a starting symbol index and a maximum number of symbols for each of the plurality of repetitions of UCI on PUSCH. In one embodiment, the method includes multiplexing UCI on PUSCH for transmitting UCI to a node of a mobile wireless communication network based on the starting symbol index and the maximum number of symbols for each of the plurality of repetitions according to an indicated beta-offset value.

In one embodiment, another apparatus includes a transceiver that sends, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the transceiver sends, to the UE device, a configuration to determine a starting symbol index and a maximum number of symbols for each of the plurality of repetitions of UCI on PUSCH. In one embodiment, the transceiver receives, from the UE device, UCI on PUSCH that is multiplexed based on the starting symbol index and the maximum number of symbols for each of the plurality of repetitions according to an indicated beta-offset value.

In one embodiment, another method includes sending, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the method includes sending, to the UE device, a configuration to determine a starting symbol index and a maximum number of symbols for each of the plurality of repetitions of UCI on PUSCH. In one embodiment, the method includes receiving, from the UE device, UCI on PUSCH that is multiplexed based on the starting symbol index and the maximum number of symbols for each of the plurality of repetitions according to an indicated beta-offset value.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flowchart diagram illustrating one embodiment of a method for UCI repetitions multiplexing on PUSCH; and FIG. 6 is a flowchart diagram illustrating one embodiment of another method for UCI repetitions multiplexing on PUSCH.

DETAILED DESCRIPTION

Figure 1:
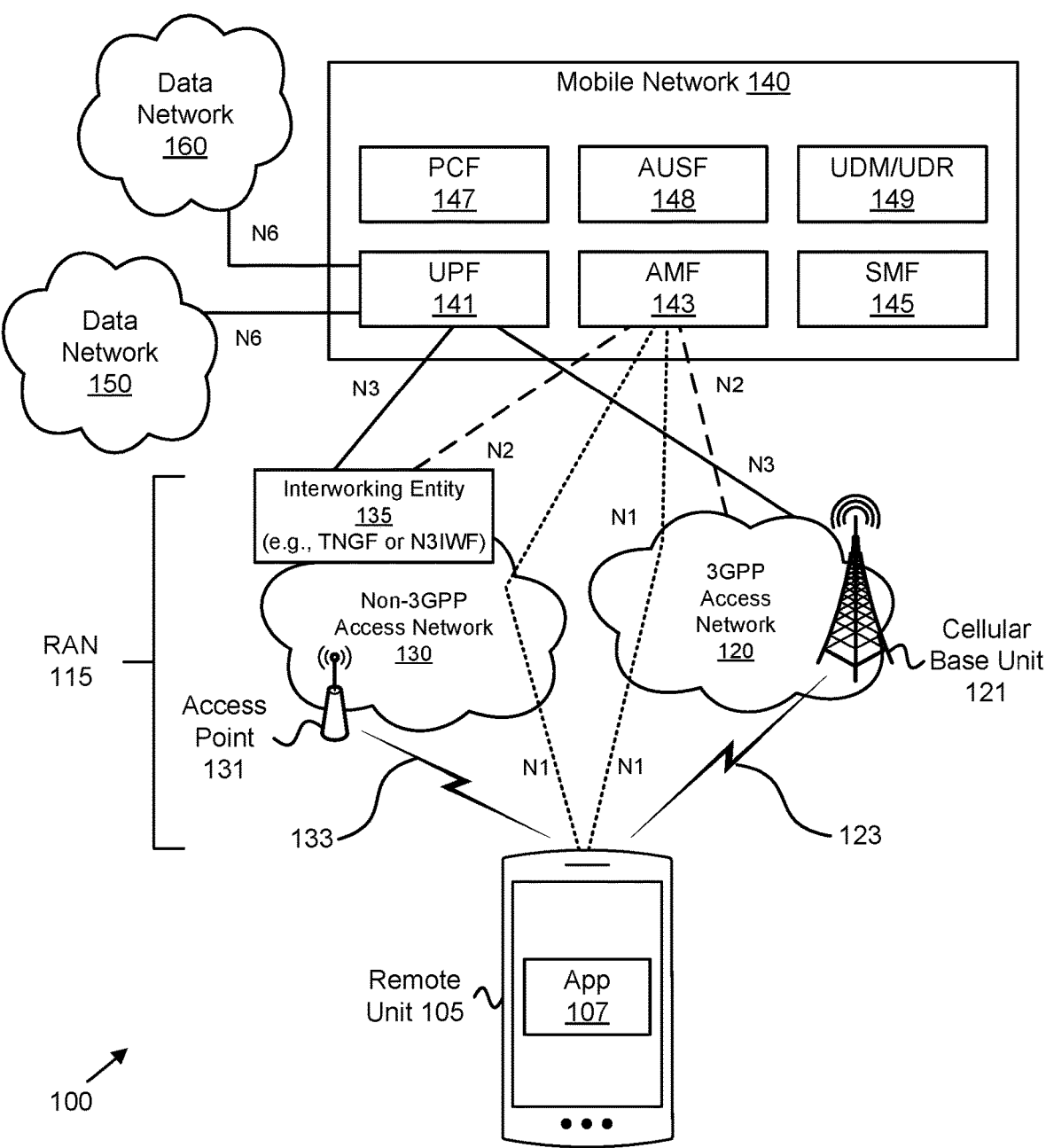
FIG. 1 is a schematic block diagram illustrating one embodiment of a wireless communication system for UCI repetitions multiplexing on PUSCH.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for UCI repetitions multiplexing on PUSCH. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Regarding enhanced ultra-reliable and low latency communications ("eURLLC"), various work items have been approved for Rel. 17 NR in RP-193233 and updated in RP-201310. As it relates to the subject matter herein, at least two objectives are targeted—(1) Study, identify and specify if needed, required Physical Layer feedback enhancements for meeting URLLC requirements covering UE feedback enhancements for hybrid automatic repeat request-acknowledgement ("HARQ-ACK"); and (2) Intra-UE multiplexing and prioritization of traffic with different priority based on work done in Rel.16, including, specifying multiplexing behavior among HARQ-ACK, scheduling requests ("SR"), channel state information ("CSI"), and/or the like, and physical uplink shared channel ("PUSCH") for traffic with different priorities, including the cases with UCI on physical uplink control channel ("PUCCH") and UCI on PUSCH.

The subject matter disclosed herein proposes solutions for issues of multiplexing a high-priority (e.g., URLLC) UCI such as HARQ-ACK or CSI with a low-priority (e.g., enhanced mobile broadband ("eMBB")) PUSCH. In order to satisfy the reliability and latency requirements for UCI, in one embodiment, multiplexing enhancements with PUSCH and solutions for such multiplexing scenarios are discussed in this disclosure.

In one embodiment, the subject matter disclosed herein describes a new procedure and related signaling to multiplex high priority UCI including HARQ-ACK, CS, and CG-UCI on low priority PUSCH including repetition of UCI within a single PUSCH, indication of a number of repetitions along with beta offset values to indicate resources for each repetition and number repetitions, and multiplexing patterns for repetition of multi-part and/or multi quantity CSI reporting.

FIG. 1 depicts a wireless communication system 100 for UCI repetitions multiplexing on PUSCH, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NS-SAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, in one embodiment, as it relates to UCI reporting on PUSCH in NR, e.g., according to section 9.3 of 3GPP TS 38.213, the following is specified on multiplexing UCI on PUSCH:

In one embodiment, offset values are defined for a UE to determine a number of resources for multiplexing HARQ-ACK information and for multiplexing CSI reports in a PUSCH. Offset values may also be defined for multiplexing configured grant ("CG")-UCI, e.g., as in TS 38.212 in a CG-PUSCH. The offset values may be signaled to a UE either by a downlink control information ("DCI") format scheduling the PUSCH transmission or by higher layers.

If a DCI format that does not include a beta_offset indicator field schedules the PUSCH transmission from the UE and the UE is provided betaOffsets='semiStatic', in one embodiment, the UE applies the $$\beta_{offset}^{HARQ\text{-}ACK}, \beta_{offset}^{CSI\text{-}1}, \text{ and } \beta_{offset}^{CSI\text{-}2}$$

values that are provided by betaOffsets='semiStatic' for the corresponding HARQ-ACK information, Part 1 CSI reports and Part 2 CSI reports.

If the PUSCH transmission is with a configured grant and the UE is provided CG-UCI-OnPUSCH='semiStatic', in one embodiment, the UE applies the $$\beta_{offset}^{HARQ\text{-}ACK}, \beta_{offset}^{CSI\text{-}1}, \text{ and } \beta_{offset}^{CSI\text{-}2}$$

values that are provided by CG-UCI-OnPUSCH='semiStatic' for the corresponding HARQ-ACK information, Part 1 CSI reports and Part 2 CSI reports.

In one embodiment, if the PUSCH is scheduled by DCI format 0_0 and the UE is provided betaOffsets='dynamic', the UE applies the $$\beta_{offset}^{HARQ\text{-}ACK}, \beta_{offset}^{CSI\text{-}1}, \text{ and } \beta_{offset}^{CSI\text{-}2}$$

values at are determined from the first value of betaOffsets='dynamic'.

If the PUSCH is a configured grant Type 2 PUSCH activated by DCI format 0_0 and the UE is provided CG-UCI-OnPUSCH='dynamic', in one embodiment, the UE applies the $$\beta_{offset}^{HARQ\text{-}ACK}, \beta_{offset}^{CSI\text{-}1}, \text{ and } \beta_{offset}^{CSI\text{-}2}$$

values that are determined from the first value of CG-UCI-OnPUSCH 'dynamic'.

In one embodiment, HARQ-ACK information offsets $$\beta_{offset}^{HARQ\text{-}ACK}$$

are configured to values, e.g., according to Table 1 below. The betaOffsetACK-Index1, betaOffsetACK-Index2, and betaOffsetACK-Index3 respectively provide indexes $$I_{offset,0}^{HARQ\text{-}ACK}, I_{offset,1}^{HARQ\text{-}ACK}, \text{ and } I_{offset,2}^{HARQ\text{-}ACK}$$

for the UE to use if the UE multiplexes up to 2 HARQ-ACK information bits, more than 2 and up to 11 HARQ-ACK information bits, and more than 11 bits in the PUSCH, respectively.

TABLE 1

Mapping of beta_offset values for HARQ-ACK information and/or for CG-UCI and the index signalled by higher layers

| $I_{offset,0}^{HARQ\text{-}ACK}$ or $I_{offset,1}^{HARQ\text{-}ACK}$ or $I_{offset,2}^{HARQ\text{-}ACK}$ or $I_{offset}^{CG\text{-}UCI}$ | $\beta_{offset}^{HARQ\text{-}ACK}$ or $\beta_{offset}^{CG\text{-}UCI}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16 | Reserved |
| 17 | Reserved |
| 18 | Reserved |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In one embodiment, Part 1 CSI report and Part 2 CSI report offsets $$\beta_{offset}^{CSI\text{-}1}$$

and $$\beta_{offset}^{CSI\text{-}2},$$

respectively, are configured to values according to Table 2 below. In one embodiment, the betaOffsetCSI-Part1-Index1 and betaOffsetCSI-Part2-Index1 respectively provide indexes $$I_{offset,0}^{CSI-1} \text{ and } I_{offset,0}^{CSI-2}$$

for the UE to use if the UE multiplexes up to 11 bits for Part 1 CSI reports or Part 2 CSI reports in the PUSCH. The betaOffsetCSI-Part1-Index2 and betaOffsetCSI-Part2-Index2 respectively provide indexes $$I_{offset,1}^{CSI-1} \text{ or } I_{offset,1}^{CSI-2}$$

for the UE to use if the UE multiplexes more than 11 bits for Part 1 CSI reports or Part 2 CSI reports in the PUSCH.

TABLE 2

| Mapping of beta_offset values for CSI and the index signalled by higher layers | |
| --- | --- |
| $I_{offset,0}^{CSI-1}$ or $I_{offset,1}^{CSI-1}$ <br> $I_{offset,0}^{CSI-2}$ or $I_{offset,1}^{CSI-2}$ | $\beta_{offset}^{CSI-1}$ <br> $\beta_{offset}^{CSI-2}$ |
| 0 | 1.125 |
| 1 | 1.250 |
| 2 | 1.375 |
| 3 | 1.625 |
| 4 | 1.750 |
| 5 | 2.000 |
| 6 | 2.250 |
| 7 | 2.500 |
| 8 | 2.875 |
| 9 | 3.125 |
| 10 | 3.500 |
| 11 | 4.000 |
| 12 | 5.000 |
| 13 | 6.250 |
| 14 | 8.000 |
| 15 | 10.000 |
| 16 | 12.625 |
| 17 | 15.875 |
| 18 | 20.000 |
| 19 | Reserved |
| 20 | Reserved |
| 21 | Reserved |
| 22 | Reserved |
| 23 | Reserved |
| 24 | Reserved |
| 25 | Reserved |
| 26 | Reserved |
| 27 | Reserved |
| 28 | Reserved |
| 29 | Reserved |
| 30 | Reserved |
| 31 | Reserved |

In one embodiment, if a DCI format that includes a beta_offset indicator field with one bit or two bits, as configured by uci-OnPUSCH, schedules the PUSCH transmission from the UE, the UE is provided by each of {betaOffsetACK-Index1, betaOffsetACK-Index2, betaOffsetACK-Index3} a set of two or four $$I_{offset}^{HARQ-ACK}$$

indexes, by each of {betaOffsetCSI-Part1-Index1, betaOffsetCSI-Part1-Index2} a set of two or four $$I_{offset}^{CSI-1}$$

indexes, and by each of {betaOffsetCSI-Part2-Index1, betaOffsetCSI-Part2-Index2} a set of two or four $$I_{offset}^{CSI-2}$$

indexes from Tables 1 and 2, respectively, for multiplexing HARQ-ACK information, Part 1 CSI reports, and Part 2 CSI reports, respectively, in the PUSCH transmission. The beta offset indicator field, in one embodiment, indicates a $$I_{offset}^{HARQ-ACK} \text{ value, a } I_{offset}^{CSI-1}$$

value and $$I_{offset}^{CSI-2}$$

value from the respective sets of values, with the mapping defined in Table 3 and in Table 4.

TABLE 3

| Mapping of four beta_offset indicator values to offset indexes | |
| --- | --- |
| beta_offset indicator | $(I_{offset, 0}^{HARQ-ACK} \text{ or } I_{offset, 1}^{HARQ-ACK} \text{ or } I_{offset, 2}^{HARQ-ACK}), (I_{offset, 0}^{CSI-1} \text{ or } I_{offset, 0}^{CSI-2}), (I_{offset, 1}^{CSI-1} \text{ or } I_{offset, 1}^{CSI-2})$ |
| '00' | $1^{st}$ offset index provided by higher layers |
| '01' | $2^{nd}$ offset index provided by higher layers |
| '10' | $3^{rd}$ offset index provided by higher layers |
| '11' | $4^{th}$ offset index provided by higher layers |

TABLE 4

| Mapping of two beta_offset indicator values to offset indexes | |
| --- | --- |
| beta_offset indicator | $(I_{offset, 0}^{HARQ-ACK} \text{ or } I_{offset, 1}^{HARQ-ACK} \text{ or } I_{offset, 2}^{HARQ-ACK}), (I_{offset, 0}^{CSI-1} \text{ or } I_{offset, 0}^{CSI-2}), (I_{offset, 1}^{CSI-1} \text{ or } I_{offset, 1}^{CSI-2})$ |
| '0' | $1^{st}$ offset index provided by higher layers |
| '1' | $2^{nd}$ offset index provided by higher layers |

In one embodiment, for a PUSCH transmission that is configured by a ConfiguredGrantConfig, and includes CG-UCI, the UE multiplexes CG-UCI in the PUSCH transmission if the UE is provided by betaOffsetCG-UCI-r16 a $$I_{offset}^{CG-UCI}$$

value, from a set of values, with the mapping defined in Table 1. If the UE multiplexes HARQ-ACK information in the PUSCH transmission, in one embodiment, e.g., as described in Clause 9.2.5 of TS 38.212, the UE jointly encodes the HARQ-ACK information and the CG-UCI and determines a number of resources for multiplexing the combined information in a PUSCH using $$\beta_{offset}^{HARQ\text{-}ACK},$$

which provides indexes $$I_{offset,1}^{HARQ\text{-}ACK} \text{ and } I_{offset,2}^{HARQ\text{-}ACK}$$

for the UE to use if the UE multiplexes up to 11, and more than 11 combined information bits, respectively.

In one embodiment, based on current discussions, in order to multiplex different priority UCIs with PUSCH, multiple beta offset indications are being considered, where, for a high priority UCI, beta offset value, in addition to low priority UCI beta offset value, is indicated to allocate more resources. Therefore, a low coding rate can be achieved with a desired reliability. However, one potential issue with such a scheme could be that low-latency requirements are not met as more time-frequency resources would be needed to allow such low coding rate, and UCI will span more symbols in time. In this disclosure, solutions are described that allow for low-latency and high-reliability transmissions of high-priority UCI with PUSCH.

Figure 2:
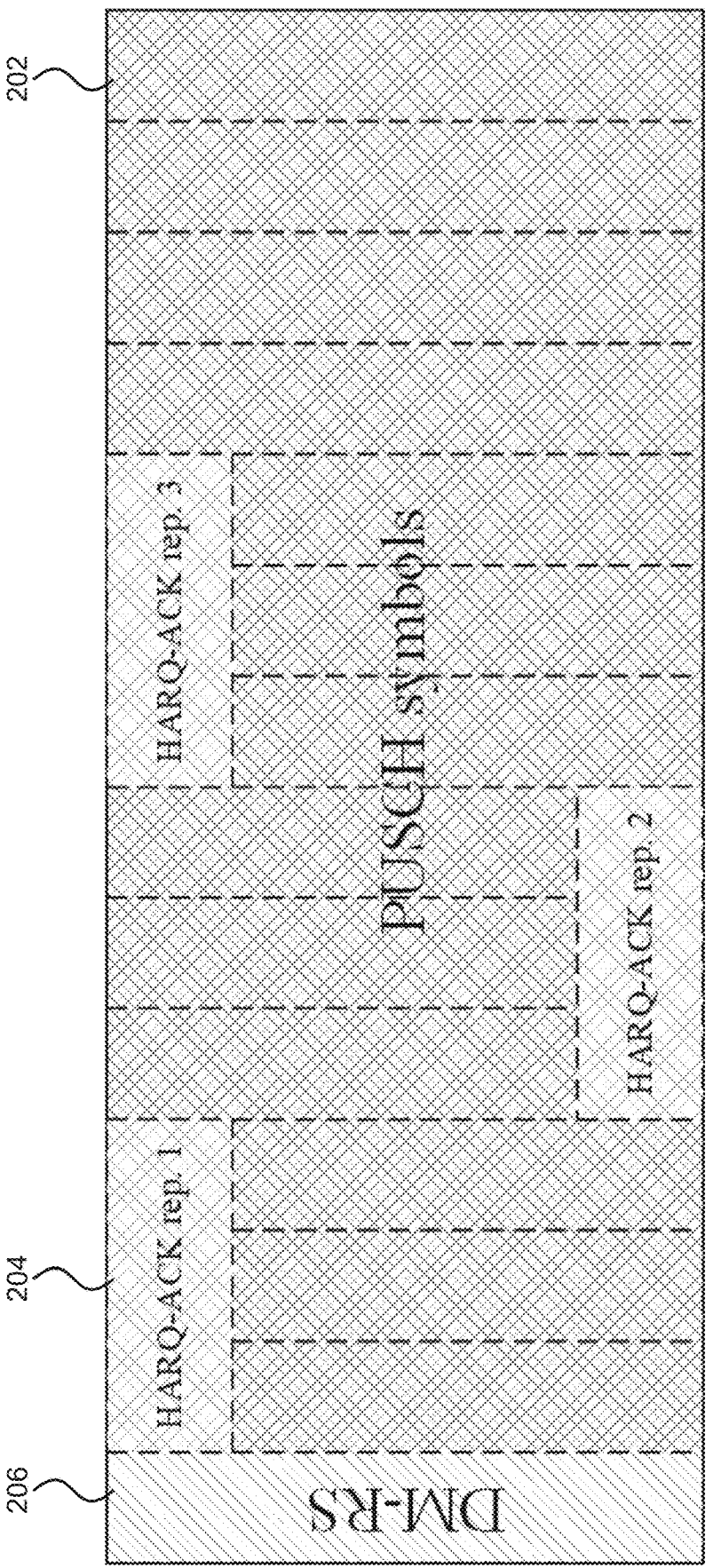
FIG. 2 is a diagram illustrating an example of multiplexing HARQ-ACK repetitions with PUSCH.

In this disclosure, enhancements for multiplexing high priority UCI (e.g., CSI and/or HARQ-ACK) on PUSCH are proposed by configuring multiple repetitions of UCI within a single PUSCH transmission occasion such that high-reliability with possibly low-latency can be achieved for UCI transmissions, when multiplexed with PUSCH, as shown in FIG. 2. Basically, a single transmission/repetition of HARQ-ACK 204 span only three PUSCH symbols 202 and three transmissions/repetitions are multiplexed. Therefore, in one embodiment, it could be possible for the gNB to decode the HARQ-ACK 204 after receiving only the first 3 symbols 202 after the DM-RS symbols 206. Further details described below include configuration/indication of repetitions for different priorities and different types of UCI, multiplexing of repetitions with PUSCH, and beta offset indication depending up on repetitions.

In one embodiment, this disclosure is directed to keeping the coding rate the same regardless of the priority of UCI multiplexed with PUSCH. In order to improve the reliability, it is proposed to multiplex multiple repetitions of the UCI within a single PUSCH transmission occasion. This is different than typical repetitions where a complete transmission occasion is repeated; here, only a single PUSCH transmission occasion is sent.

In one embodiment, regarding HARQ-ACK repetition multiplexing on PUSCH, if a DCI format that includes a beta_offset indicator field, as configured by uci-OnPUSCH, schedules the PUSCH transmission from the UE, the UE is indicated by at least one betaOffsetACK and a corresponding number of repetitions associated with the HARQ-ACK. In one implementation of the embodiment, the UE is configured with a table, e.g., Table 5 below, where each index (column 1) of the table indicates at least one betaOffsetACK (column 2) and one value for number of repetitions (column 3). If multiple set of indices are given to UE, in one embodiment, then the UE is expected to apply the correspondingly indicated repetition number. If no repetition number is indicated for an index, in one embodiment, then the UE is not expected to perform repetitions for the corresponding HARQ-ACK.

TABLE 5

| Example of combined indication of betaOffsetACK and repetition number | | |
| --- | --- | --- |
| $I_{offset,0}^{HARQ\text{-}ACK}$ | $\beta_{offset}^{HARQ\text{-}ACK}$ | $Rep^{HARQ\text{-}ACK}$ |
| 0 | 1.000 | 3 |
| 1 | 2.000 | 3 |
| 2 | 2.500 | 2 |
| 3 | 3.125 | 2 |
| . . . | . . . | |

In another implementation of the embodiment, the UE is dynamically indicated (e.g., dynamically provided, sent, or otherwise configured) with at least one repetition number by a separate DCI field $Rep^{HARQ\text{-}ACK}$. Different values of repetition numbers may be indicated corresponding to different sizes of HARQ-ACK payload, such as $Rep^{HARQ\text{-}ACK1}$ for a payload size up to 2 bits, $Rep^{HARQ\text{-}ACK2}$ for a payload size from 2-11 bits and $Rep^{HARQ\text{-}ACK3}$ for a payload size beyond 11 bits. UE is expected to apply the repetitions to only high priority HARQ-ACK among the set of HARQ-ACK UCIs that are to be multiplexed with the PUSCH. In an alternate implementation, the repetition number for high priority HARQ-ACK multiplexing with PUSCH is semi-statically configured by radio resource control ("RRC"). In one implementation, the $Rep^{HARQ\text{-}ACK}$ is included in the PUSCH-config information element ("IE") for dynamic PUSCH.

In one embodiment, if a DCI format that does not include a beta_offset indicator field schedules the PUSCH transmission from the UE and the UE is provided betaOffsets='semiStatic', the UE applies the $$\beta_{offset}^{HARQ\text{-}ACK}$$

and corresponding repetition number values that are provided by betaOffsets='semiStatic' for the corresponding HARQ-ACK information.

In one embodiment, if the PUSCH transmission is with a configured grant and the UE is provided CG-UCI-OnPUSCH='semiStatic', the UE applies the $$\beta_{offset}^{HARQ\text{-}ACK}$$

and corresponding repetition number values that are provided by CG-UCI-OnPUSCH='semiStatic' for the corresponding HARQ-ACK information.

In another embodiment, if the PUSCH is scheduled by DCI format 0_0 and the UE is provided betaOffsets='dynamic', the UE applies the $$\beta_{offset}^{HARQ\text{-}ACK}$$

and corresponding repetition number values that are determined from the first value of betaOffsets='dynamic'.

In another embodiment, if the PUSCH is a configured grant Type 2 PUSCH activated by DCI format 0_0 and the UE is provided CG-UCI-OnPUSCH='dynamic', the UE applies the $$\beta_{offset}^{HARQ\text{-}ACK}$$

and corresponding repetition number values that are determined from the first value of CG-UCI-OnPUSCH='dynamic'.

In one embodiment, if a PUSCH transmission is configured by a ConfiguredGrantConfig, and includes CG-UCI, the UE multiplexes CG-UCI in the PUSCH transmission if the UE is provided by betaOffsetCG-UCI-r16 a $$I_{offset}^{CG\text{-}UCI}$$

value indicating the offset and corresponding number of repetitions, from a set of values, as illustrated in Table 5. If the UE multiplexes HARQ-ACK information in the PUSCH transmission, in one embodiment, the UE jointly encodes the HARQ-ACK information and the CG-UCI only if both belongs to the same priority level such as both are URLLC and determines a number of resources for multiplexing the combined information in a PUSCH using $$\beta_{offset}^{HARQ\text{-}ACK}$$

and the corresponding repetition number, as illustrated in Table 5.

In some embodiments, when the UE is indicated or configured with high priority HARQ-ACK multiplexing on PUSCH based on beta offset value(s) and corresponding repetition number, then the UE can be additionally indicated one of more of the following:

A maximum number of symbols that can be used for one transmission/repetition of HARQ-ACK multiplexing on PUSCH;

Symbols gap between transmission/repetition of HARQ-ACK multiplexing on PUSCH; and/or Symbol offset between the last symbol of front-loaded DM-RS for PUSCH and first symbol for multiplexing first transmission/repetition of HARQ-ACK on PUSCH.

In some embodiments, repetitions for HARQ-ACK and/or CG-UCI multiplexed on PUSCH is applied only when PUSCH has lower priority compared to HARQ-ACK/CG-UCI

PRIORITY

In other embodiments, repetitions for HARQ-ACK multiplexed on PUSCH is applied only when a PUCCH resource for HARQ-ACK feedback is a sub-slot based PUCCH resource (e.g., sub-slot based HARQ-ACK feedback).

In one embodiment, when high-priority HARQ-ACK information and low-priority HARQ-ACK information are multiplexed in a PUSCH, the high-priority HARQ-ACK information is encoded considering repetition within the PUSCH and the low-priority HARQ-ACK is separately encoded without considering repetition. Such an embodiment may interpedently consider the coded modulation symbols for high priority and low priority. In other words, low priority HARQ-ACK information is sent without repetition and high priority HARQ-ACK information is sent with repetition.

In one implementation, the number of coded modulation symbols per layer for low-priority HARQ-ACK transmission is determined based on the number of coded modulation symbols per layer for a single high-priority HARQ-ACK transmission and the number of repetitions of high-priority HARQ-ACK transmission. For example, for low-priority HARQ-ACK transmission on PUSCH not using repetition type B with uplink shared channel ("UL-SCH"), the number of coded modulation symbols per layer for low-priority HARQ-ACK transmission, denoted as $Q_{ACK\text{-}L}'$, is dependent upon high priority HARQ-ACK transmission and is determined as follows:

$$Q_{ACK\text{-}L}' = \min \left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}SCH}-1} K_r} \right\rceil, \left\lceil \alpha \cdot \sum_{l=l_0}^{N_{symb,all}^{PUSCH}-1} M_{sc}^{UCI}(l) \right\rceil - N_{rep} \cdot Q_{ACK\text{-}H}' \right\}$$

where:

$Q_{ACK}$ is the number of low-priority HARQ-ACK bits;

$Q_{ACK\text{-}H}$ is the number of coded modulation symbols per layer for a single high-priority HARQ-ACK transmission;

$N_{rep}$ is the number of repetitions of high-priority HARQ-ACK transmission;

if $Q_{ACK} \geq 360$, $L_{ACK}=11$; otherwise $L_{ACK}$ is the number of CRC bits for HARQ-ACK, e.g., as determined according to Clause 6.3.1.2.1;

$$\beta_{offset}^{PUSCH} = \beta_{offset}^{HARQ\text{-}ACK};$$

$C_{UL\text{-}SCH}$ is the number of code blocks for UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for UL-SCH of the PUSCH transmission;

$$M_{sc}^{PUSCH}$$

is the scheduled bandwidth of the PUSCH transmission, expressed as a number of subcarriers;

$$M_{sc}^{PT\text{-}RS}(l)$$

is the number of subcarriers in OFDM symbol/that carries PTRS, in the PUSCH transmission;

$$M_{sc}^{UCI}(l)$$

is the number of resource elements that can be used for transmission of UCI in OFDM symbol l, for l=0, 1, 2, . . . , $$N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l) = 0;$$

for any OFDM symbol that does not carry DMRS of the PUSCH, $$M_{sc}^{UCI}(l) = M_{sc}^{PUSCH} - M_{sc}^{PT-RS}(l);$$

$\alpha$ is configured by higher layer parameter scaling; and $l_0$ is the symbol index of the first OFDM symbol that does not carry DMRS of the PUSCH, after the first DMRS symbol(s), in the PUSCH transmission.

In one embodiment for CSI repetition multiplexing on PUSCH, if a DCI format that includes a beta_offset indicator field, as configured by uci-OnPUSCH, schedules the PUSCH transmission from the UE, the UE is indicated by at least one betaOffsetCSI and a corresponding number of repetitions associated with the CSI. In one implementation of the embodiment, the UE is configured with a table, e.g., Table 6 below, where each index (column 1) of the table indicates at least one betaOffsetCSI (column 2) and one value for number of repetitions (column 3). If multiple sets of indices are given to UE, in one embodiment, then the UE is expected to apply the correspondingly indicated repetition number. If no repetition number is indicated for an index, in one embodiment, then the UE is not expected to perform repetitions for the corresponding CSI.

TABLE 6

| Example of combined indication of betaOffsetCSI and repetition number | | |
| --- | --- | --- |
| $I_{offset, 0}^{CSI-1}$ | $\beta_{offset}^{CSI}$ | $Rep^{CSI}$ |
| 0 | 1.000 | 3 |
| 1 | 2.000 | 3 |
| 2 | 2.500 | 2 |
| 3 | 3.125 | 2 |
| . . . | . . . | |

If two-part CSI is multiplexed with PUSCH, in one embodiment, then the same repetition number is applied to both parts. If repetition numbers are indicated for CSI parts, in one embodiment, then the repetition number associated with the first part is also expected to be applied to the second CSI part. For multi-part CSI with repetitions multiplexing on PUSCH, in one embodiment, one of the following multiplexing sequence in time can be configure/indicated to the UE:

CSI part 1 repetition 1, CSI part 2 repetition 1, CSI part 1 repetition 2, CSI part 2 repetition 2;

CSI part 1 repetition 1, CSI part 1 repetition 2, CSI part 2 repetition 1, CSI part 2 repetition 2.

The foregoing pattern is different from HARQ-ACK. Currently in NR, in one embodiment, CSI can be transmitted in two parts (e.g., when size is too large). Here, however, the same number of repetitions is applied to both the CSI parts.

In another implementation of the embodiment, a UE is dynamically indicated with at least one repetition number by a separate DCI field $Rep^{CSI}$. The UE, in one embodiment, is expected to apply the repetitions to only high-priority CSI that is to be multiplexed with the PUSCH. In an alternate implementation, the repetition number for high priority CSI multiplexing with PUSCH is semi-statically configured by RRC. In one implementation, the $Rep^{CSI}$ is included in the PUSCH-config IE for dynamic PUSCH.

In one embodiment, if a DCI format that does not include a beta_offset indicator field schedules the PUSCH transmission from the UE and the UE is provided betaOffsets 'semiStatic', the UE applies the $$\beta_{offset}^{CSI-1}$$

and corresponding repetition number values that are provided by betaOffsets='semiStatic' for the corresponding CSI-1

In one embodiment, if the PUSCH transmission is with a configured grant and the UE is provided CG-UCI-OnPUSCH='semiStatic', the UE applies the $$\beta_{offset}^{CSI-1}$$

and corresponding repetition number values that are provided by CG-UCI-OnPUSCH='semiStatic' for the corresponding CSI-1 information.

In another embodiment, if the PUSCH is scheduled by DCI format 0_0 and the UE is provided betaOffsets='dynamic', the UE applies the $$\beta_{offset}^{CSI-1}$$

and corresponding repetition number values that are determined from the first value of betaOffsets='dynamic'.

In another embodiment, if the PUSCH is a configured grant Type 2 PUSCH activated by DCI format 0_0 and the UE is provided CG-UCI-OnPUSCH='dynamic', the UE applies the $$\beta_{offset}^{CSI-1}$$

and corresponding repetition number values that are determined from the first value of CG-UCI-OnPUSCH='dynamic'.

In some embodiments, when the UE is indicated or configured with high priority CSI multiplexing on PUSCH based on beta offset value(s) and corresponding repetition number, then the UE can be additionally indicated one or more of the following:

A maximum number of symbols that can be used for one transmission/repetition of CSI multiplexing on PUSCH;

Symbols gap between transmission/repetition of CSI multiplexing on PUSCH; and

Symbol offset between the last symbol of front-loaded DM-RS for PUSCH and first symbol for multiplexing first transmission/repetition of CSI on PUSCH.

In an embodiment, different CSI reports (e.g., different CSI-ReportConfig or reportQuantity) are associated with different repetition number/patter/parameters. In one embodiment, if multiple CSI reports are multiplexed in a PUSCH, the repetition number/pattern/parameters are determined based on the CSI report which is associated with more repetitions, or alternatively the DCI indicates the CSI report index for which the repetition number/pattern/parameters for CSI reporting.

In Rel-17, for instance, various CSI enhancements for URLLC are being discussed in 3GPP including:

Reporting more accurate interference characteristics (e.g., channel quality indicator ("CQI") variance, reporting CQI/CSI for the worst M sub-bands);

Reduced CSI feedback overhead (e.g., reporting interference measurement only); and PDSCH/PDCCH decoding based metrics (e.g., PDSCH decoding margin, PDSCH decoding failure).

In an embodiment, the repetition number/pattern/parameters for different CSI reports/contents (e.g., CQI variance and PDSCH decoding margin) can be different (e.g., different RRC parameters for each CSI report type).

In an example, multiple of the above-mentioned CSI enhancements/reports may be multiplexed in a PUSCH (e.g., CQI variance and PDSCH decoding margin may be multiplexed in a PUSCH).

In an embodiment, the mapping order of CSI is fixed in the specifications or alternatively configured. For example, PDSCH decoding margin may be mapped in the first set of symbols of the PUSCH, and interference statistics/interference related CSI such as worst M-subbands is mapped in the second set of symbols of the PUSCH, wherein the first set of symbols occur before the second set of symbols.

In an embodiment, the CSI report transmission parameters, such as beta offset values for CSI-1 and CSI-2, are determined based on the beta_offsets indicated in the corresponding DCI ( $$\beta_{offset}^{CSI\text{-}1}, \text{ and } \beta_{offset}^{CSI\text{-}2}$$

)/configured (in case betaOffsets='semiStatic') and the CSI content/payload type/size. In one embodiment, depending on what information may be transmitted as part of CSI part 1 and CSI part 2, the payload for part 2 may vary.

In one embodiment, the actual content of the CSI part 2 may be a function of measurements, e.g., measurements with large observed interference and/or least observed interference. In one embodiment, the CSI content may include interference statistics (e.g., CQI variance), a notion/indication of PDSCH decoding margin, and/or the like. In one embodiment, the CSI payload, which can include multiple CSI reports, may vary e.g., if there is not much change from a previously reported CSI, the (almost) unchanged CSI report may not be multiplexed.

In one embodiment, different CSI content/payload type/size may have different additional offset to the associated indicated/configured beta_offset values. For example, the beta offset associated with CQI variance indication may be different than the beta offset associated with PDSCH decoding margin indication.

In one embodiment, the actual beta for $\beta\_\{offset\}^\{CSI\text{-}2\}$ is determined based on the indicated/configured $$\beta_{offset}^{CSI\text{-}2}$$

and the content of CSI-1 (e.g., related to CSI-2), payload size/type of CSI-2 determined at the UE (CSI-1: CSI part 1; CSI-2: CSI part 2).

In an embodiment, a special UCI in the PUSCH indicates the repetition number/pattern/parameters for HARQ-ACK information or CSI report(s) multiplexing.

In an embodiment, a first set of offset values (\beta_{offset}) to determine number of resources for multiplexing HARQ-ACK information and/or for multiplexing CSI reports in a PUSCH are indicated by the UE to the network.

In an example, a special UCI with a known associated offset value contains information regarding the first set of offset values. In another example, the offset values are associated with high priority HARQ-ACK information and/or for high priority CSI reports, e.g., the PUSCH may have low priority. In further examples, the PUSCH relative priority is lower than the relative UCI (e.g., HARQ-ACK information and/or CSI reports) priority. In such an embodiment, relative priorities are defined/determined e.g., based on the DCI scheduling PDSCH for which the HARQ-ACK information to be multiplexed in PUSCH or based on the DCI scheduling the PUSCH. For example, the DCI scheduling the PUSCH would indicate if high priority HARQ-ACK information and/or high priority CSI reports can be multiplexed in the PUSCH.

Figure 3:
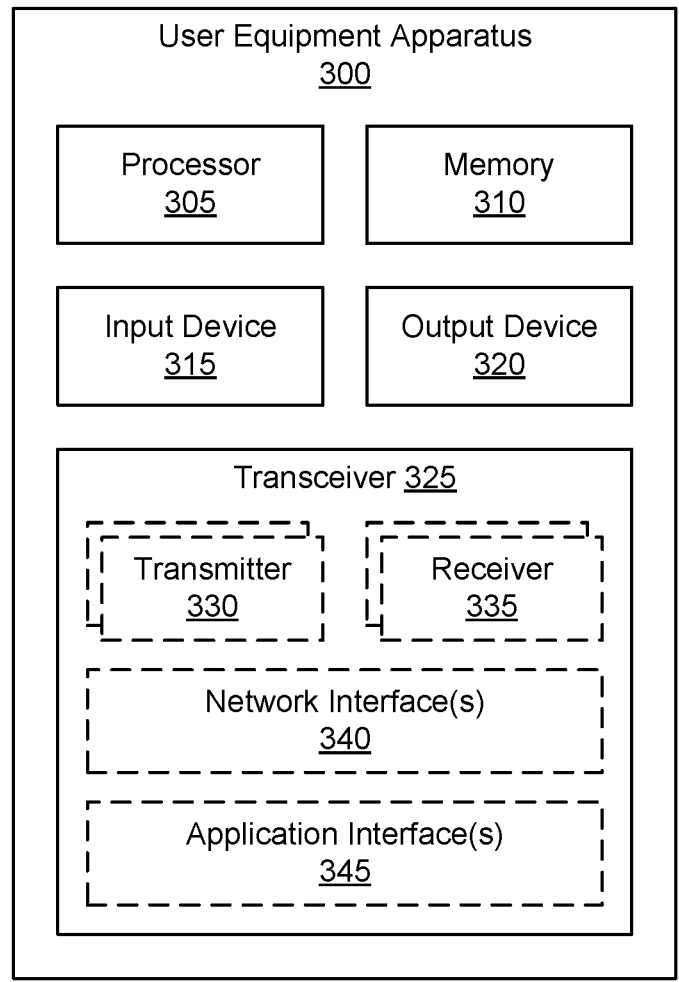
FIG. 3 is a block diagram illustrating one embodiment of a user equipment apparatus that may be used for UCI repetitions multiplexing on PUSCH.

FIG. 3 depicts a user equipment apparatus 300 that may be used for UCI repetitions multiplexing on PUSCH, according to embodiments of the disclosure. In various embodiments, the user equipment apparatus 300 is used to implement one or more of the solutions described above. The user equipment apparatus 300 may be one embodiment of the remote unit 105 and/or the UE, described above. Furthermore, the user equipment apparatus 300 may include a processor 305, a memory 310, an input device 315, an output device 320, and a transceiver 325.

In some embodiments, the input device 315 and the output device 320 are combined into a single device, such as a touchscreen. In certain embodiments, the user equipment apparatus 300 may not include any input device 315 and/or output device 320. In various embodiments, the user equipment apparatus 300 may include one or more of: the processor 305, the memory 310, and the transceiver 325, and may not include the input device 315 and/or the output device 320.

As depicted, the transceiver 325 includes at least one transmitter 330 and at least one receiver 335. In some embodiments, the transceiver 325 communicates with one or more cells (or wireless coverage areas) supported by one or more base units 121. In various embodiments, the transceiver 325 is operable on unlicensed spectrum. Moreover, the transceiver 325 may include multiple UE panel support-ing one or more beams. Additionally, the transceiver 325 may support at least one network interface 340 and/or application interface 345. The application interface(s) 345 may support one or more APIs. The network interface(s) 340 may support 3GPP reference points, such as Uu, N1, PC5, etc. Other network interfaces 340 may be supported, as understood by one of ordinary skill in the art.

The processor 305, in one embodiment, may include any known controller capable of executing computer-readable instructions and/or capable of performing logical operations. For example, the processor 305 may be a microcontroller, a microprocessor, a central processing unit ("CPU"), a graph-ics processing unit ("GPU"), an auxiliary processing unit, a field programmable gate array ("FPGA"), or similar pro-grammable controller. In some embodiments, the processor 305 executes instructions stored in the memory 310 to perform the methods and routines described herein. The processor 305 is communicatively coupled to the memory 310, the input device 315, the output device 320, and the transceiver 325. In certain embodiments, the processor 305 may include an application processor (also known as "main processor") which manages application-domain and operat-ing system ("OS") functions and a baseband processor (also known as "baseband radio processor") which manages radio functions.

In various embodiments, the processor 305 and trans-ceiver 325 control the user equipment apparatus 300 to implement the above described UE behaviors. In one embodiment, the transceiver 325 receives an indication comprising at least a beta-offset value and multiplexing of a plurality of repetitions of uplink control information ("UCI") on a single transmission occasion of physical uplink shared channel ("PUSCH"). In one embodiment, the trans-ceiver 325 receives a configuration to determine a starting symbol index and a maximum number of symbols for each of the plurality of repetitions of UCI on PUSCH. In one embodiment the processor 305 that multiplexes UCI on PUSCH for transmitting UCI to a node of a mobile wireless communication network based on the starting symbol index and the maximum number of symbols for each of the plurality of repetitions according to an indicated beta-offset value.

In one embodiment, the processor 305 semi-statically configures the UE with a table comprising the beta-offset values and the corresponding plurality of repetitions, the table indexed such that an index into the table indicates the beta-offset value and the number of repetitions to determine resources for multiplexing UCI repetition on PUSCH.

In one embodiment, the processor 305 semi-statically configures the UE with a table comprising the beta-offset values and the corresponding plurality of repetitions, the table indexed such that an index into the table indicates only the beta-offset value and separately one of configures and dynamically indicates to the UE one or more values repre-senting the number of repetitions to determine resources for multiplexing UCI repetition on PUSCH.

In one embodiment, different values for the number of repetitions are separately one of configured and dynamically indicated to the UE based on a type of UCI and a priority level of each of the UCI, the UCI type selected from the group comprising a Hybrid Automatic Repeat Request-Acknowledgement ("HARQ-ACK"), channel state informa-tion ("CSI"), and configured grant ("CG")-UCI.

In one embodiment, the processor 305 does not apply repetitions to UCI that has a priority level less than a predefined threshold in response to a single value for the number of repetitions being configured and the UE being one of configured and dynamically indicated to multiplex a plurality of UCIs with at least two different priority levels.

In one embodiment, the processor 305 one of configures and dynamically indicates to the UE one or more of a multiple part CSI for multiplexing on PUSCH, the number of repetitions for CSI multiplexing, and a multiplexing pattern between different CSI parts and repetitions.

In one embodiment, the processor 305, for a multi-part CSI repetition on PUSCH, multiplexes the parts of the multi-part CSI on a per-repetition basis for each CSI part. In one embodiment, the processor 305, for a multi-part CSI repetition on PUSCH, multiplexes the parts of the multi-part CSI on a per-CSI part basis for each repetition. In one embodiment, the processor 305 configures a separate num-ber of repetitions for different CSI parts to be multiplexed on PUSCH.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile com-puter storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to UCI repetitions multiplexing on PUSCH. For example, the memory 310 may store various parameters, panel/beam configurations, resource assignments, policies, and the like as described above. In certain embodiments, the memory 310 also stores program code and related data, such as an operating system or other controller algorithms operating on the user equipment apparatus 300.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touch-screen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electroni-cally controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dash-board, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all, or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages.

The transceiver 325 includes at least transmitter 330 and at least one receiver 335. One or more transmitters 330 may be used to provide UL communication signals to a base unit 121, such as the UL transmissions described herein. Similarly, one or more receivers 335 may be used to receive DL communication signals from the base unit 121, as described herein. Although only one transmitter 330 and one receiver 335 are illustrated, the user equipment apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network interface 340.

In various embodiments, one or more transmitters 330 and/or one or more receivers 335 may be implemented and/or integrated into a single hardware component, such as a multi-transceiver chip, a system-on-a-chip, an ASIC, or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodiment, the transmitters 330 and receivers 335 may be logically configured as a transceiver 325 that uses one more common control signals or as modular transmitters 330 and receivers 335 implemented in the same hardware chip or in a multi-chip module.

Figure 4:
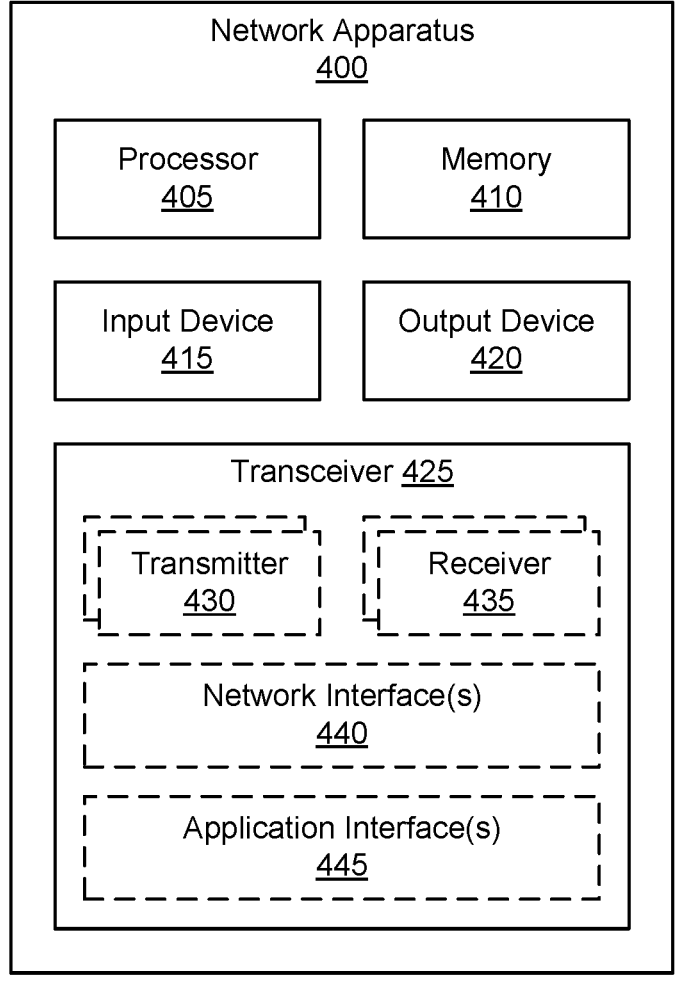
FIG. 4 is a block diagram illustrating one embodiment of a network apparatus that may be used for UCI repetitions multiplexing on PUSCH.

FIG. 4 depicts a network apparatus 400 that may be used for UCI repetitions multiplexing on PUSCH, according to embodiments of the disclosure. In one embodiment, network apparatus 400 may be one implementation of a RAN node, such as the base unit 121, the RAN node 210, or gNB, described above. Furthermore, the base network apparatus 400 may include a processor 405, a memory 410, an input device 415, an output device 420, and a transceiver 425.

In some embodiments, the input device 415 and the output device 420 are combined into a single device, such as a touchscreen. In certain embodiments, the network apparatus 400 may not include any input device 415 and/or output device 420. In various embodiments, the network apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. Here, the transceiver 425 communicates with one or more remote units 105. Additionally, the transceiver 425 may support at least one network interface 440 and/or application interface 445. The application interface(s) 445 may support one or more APIs. The network interface(s) 440 may support 3GPP reference points, such as Uu, N1, N2 and N3. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a CPU, a GPU, an auxiliary processing unit, a FPGA, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and operating system ("OS") functions and a baseband processor (also known as "baseband radio processor") which manages radio function.

In various embodiments, the network apparatus 400 is a RAN node (e.g., gNB) that includes a processor 405 and a transceiver 425. In one embodiment, the transceiver 425 sends, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the transceiver 425 sends, to the UE device, a configuration to determine a starting symbol index and a maximum number of symbols for each of the plurality of repetitions of UCI on PUSCH. In one embodiment, the transceiver 425 receives, from the UE device, UCI on PUSCH that is multiplexed based on the starting symbol index and the maximum number of symbols for each of the plurality of repetitions according to an indicated beta-offset value.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to UCI repetitions multiplexing on PUSCH. For example, the memory 410 may store parameters, configurations, resource assignments, policies, and the like, as described above. In certain embodiments, the memory 410 also stores program code and related data, such as an operating system or other controller algorithms operating on the network apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the network apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all, or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. One or more transmitters 430 may be used to communicate with the UE, as described herein. Similarly, one or more receivers 435 may be used to communicate with network functions in the non-public network ("NPN"), PLMN and/or RAN, as described herein. Although only one transmitter 430 and one receiver 435 are illustrated, the network apparatus 400 may have any suitable number of transmitters 430 and receivers 435. Further, the transmitter(s) 430 and the receiver(s) 435 may be any suitable type of transmitters and receivers.

FIG. 5 is a flowchart diagram of a method 500 for UCI repetitions multiplexing on PUSCH. The method 500 may be performed by a UE as described herein, for example, the remote unit 105, the UE and/or the user equipment apparatus 300. In some embodiments, the method 500 may be performed by a processor executing program code, for example, a microcontroller, a microprocessor, a CPU, a GPU, an auxiliary processing unit, a FPGA, or the like.

In one embodiment, the method 500 includes receiving 505 an indication comprising at least a beta-offset value and multiplexing of a plurality of repetitions of uplink control information ("UCI") on a single transmission occasion of physical uplink shared channel ("PUSCH"). In one embodiment, the method 500 includes receiving 510 a configuration to determine a starting symbol index and a maximum number of symbols for each of the plurality of repetitions of UCI on PUSCH. In one embodiment, the method 500 includes multiplexing 515 UCI on PUSCH for transmitting UCI to a node of a mobile wireless communication network based on the starting symbol index and the maximum number of symbols for each of the plurality of repetitions according to an indicated beta-offset value, and the method 500 ends.

FIG. 6 is a flowchart diagram of a method 600 for UCI repetitions multiplexing on PUSCH. The method 600 may be performed by a network entity such as a base node, a gNB, and/or the network equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 includes sending 605, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the method 600 includes sending 610, to the UE device, a configuration to determine a starting symbol index and a maximum number of symbols for each of the plurality of repetitions of UCI on PUSCH. In one embodiment, the method 600 includes receiving 615, from the UE device, UCI on PUSCH that is multiplexed based on the starting symbol index and the maximum number of symbols for each of the plurality of repetitions according to an indicated beta-offset value, and the method 600 ends.

A first apparatus is disclosed for UCI repetitions multiplexing on PUSCH. The first apparatus may include a UE as described herein, for example, the remote unit 105, the UE and/or the user equipment apparatus 300. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that receives an indication comprising at least a beta-offset value and multiplexing of a plurality of repetitions of uplink control information ("UCI") on a single transmission occasion of physical uplink shared channel ("PUSCH"). In one embodiment, the transceiver receives a configuration to determine a starting symbol index and a maximum number of symbols for each of the plurality of repetitions of UCI on PUSCH. In one embodiment the first apparatus includes a processor that multiplexes UCI on PUSCH for transmitting UCI to a node of a mobile wireless communication network based on the starting symbol index and the maximum number of symbols for each of the plurality of repetitions according to an indicated beta-offset value.

In one embodiment, the processor semi-statically configures the UE with a table comprising the beta-offset values and the corresponding plurality of repetitions, the table indexed such that an index into the table indicates the beta-offset value and the number of repetitions to determine resources for multiplexing UCI repetition on PUSCH.

In one embodiment, the processor semi-statically configures the UE with a table comprising the beta-offset values and the corresponding plurality of repetitions, the table indexed such that an index into the table indicates only the beta-offset value and separately one of configures and dynamically indicates to the UE one or more values representing the number of repetitions to determine resources for multiplexing UCI repetition on PUSCH.

In one embodiment, different values for the number of repetitions are separately one of configured and dynamically indicated to the UE based on a type of UCI and a priority level of each of the UCI, the UCI type selected from the group comprising a Hybrid Automatic Repeat Request-Acknowledgement ("HARQ-ACK"), channel state information ("CSI"), and configured grant ("CG")-UCI.

In one embodiment, the processor does not apply repetitions to UCI that has a priority level less than a predefined threshold in response to a single value for the number of repetitions being configured and the UE being one of configured and dynamically indicated to multiplex a plurality of UCIs with at least two different priority levels.

In one embodiment, the processor one of configures and dynamically indicates to the UE one or more of a multiple part CSI for multiplexing on PUSCH, the number of repetitions for CSI multiplexing, and a multiplexing pattern between different CSI parts and repetitions.

In one embodiment, the processor, for a multi-part CSI repetition on PUSCH, multiplexes the parts of the multi-part CSI on a per-repetition basis for each CSI part. In one embodiment, the processor, for a multi-part CSI repetition on PUSCH, multiplexes the parts of the multi-part CSI on a per-CSI part basis for each repetition. In one embodiment, the processor configures a separate number of repetitions for different CSI parts to be multiplexed on PUSCH.

A first method is disclosed for UCI repetitions multiplexing on PUSCH. The first method may be performed by a UE as described herein, for example, the remote unit 105, the UE and/or the user equipment apparatus 300. In some embodiments, the first method may be performed by a processor executing program code, for example, a microcontroller, a microprocessor, a CPU, a GPU, an auxiliary processing unit, a FPGA, or the like.

In one embodiment, the first method includes receiving an indication comprising at least a beta-offset value and multiplexing of a plurality of repetitions of uplink control information ("UCI") on a single transmission occasion of physical uplink shared channel ("PUSCH"). In one embodiment, the first method includes receiving a configuration to determine a starting symbol index and a maximum number of symbols for each of the plurality of repetitions of UCI on PUSCH. In one embodiment, the first method includes multiplexing UCI on PUSCH for transmitting UCI to a node of a mobile wireless communication network based on the starting symbol index and the maximum number of symbols for each of the plurality of repetitions according to an indicated beta-offset value.

In one embodiment, the first method includes semi-statically configuring the UE with a table comprising the beta-offset values and the corresponding plurality of repetitions, the table indexed such that an index into the table indicates the beta-offset value and the number of repetitions to determine resources for multiplexing UCI repetition on PUSCH.

In one embodiment, the first method includes semi-statically configuring the UE with a table comprising the beta-offset values and the corresponding plurality of repetitions, the table indexed such that an index into the table indicates only the beta-offset value and separately one of configures and dynamically indicates to the UE one or more values representing the number of repetitions to determine resources for multiplexing UCI repetition on PUSCH.

In one embodiment, different values for the number of repetitions are separately one of configured and dynamically indicated to the UE based on a type of UCI and a priority level of each of the UCI, the UCI type selected from the group comprising a Hybrid Automatic Repeat Request-Acknowledgement ("HARQ-ACK"), channel state information ("CSI"), and configured grant ("CG")-UCI.

In one embodiment, the first method includes not applying repetitions to UCI that has a priority level less than a predefined threshold in response to a single value for the number of repetitions being configured and the UE being one of configured and dynamically indicated to multiplex a plurality of UCIs with at least two different priority levels.

In one embodiment, the first method includes one of configuring and dynamically indicating to the UE one or more of a multiple part CSI for multiplexing on PUSCH, the number of repetitions for CSI multiplexing, and a multiplexing pattern between different CSI parts and repetitions.

In one embodiment, the first method includes, for a multi-part CSI repetition on PUSCH, multiplexing the parts of the multi-part CSI on a per-repetition basis for each CSI part. In one embodiment, the first method includes, for a multi-part CSI repetition on PUSCH, multiplexing the parts of the multi-part CSI on a per-CSI part basis for each repetition. In one embodiment, the first method includes configuring a separate number of repetitions for different CSI parts to be multiplexed on PUSCH.

A second apparatus is disclosed for UCI repetitions multiplexing on PUSCH. The second apparatus may include a network entity such as a base node, a gNB, and/or the network equipment apparatus 400. In some embodiments, the second apparatus includes a processor executing program code, for example, a microcontroller, a microprocessor, a CPU, a GPU, an auxiliary processing unit, a FPGA, or the like.

The second apparatus includes a transceiver that sends, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the transceiver sends, to the UE device, a configuration to determine a starting symbol index and a maximum number of symbols for each of the plurality of repetitions of UCI on PUSCH. In one embodiment, the transceiver receives, from the UE device, UCI on PUSCH that is multiplexed based on the starting symbol index and the maximum number of symbols for each of the plurality of repetitions according to an indicated beta-offset value.

A second method is disclosed for UCI repetitions multiplexing on PUSCH. The second method may be performed by a network entity such as a base node, a gNB, and/or the network equipment apparatus 400. In some embodiments, the second method may be performed by a processor executing program code, for example, a microcontroller, a microprocessor, a CPU, a GPU, an auxiliary processing unit, a FPGA, or the like.

The second method includes sending, to a user equipment ("UE") device, an indication comprising at least a beta-offset value and multiplexing of a plurality of repetitions of uplink control information ("UCI") on a single transmission occasion of physical uplink shared channel ("PUSCH"). In one embodiment, the second method includes sending, to the UE device, a configuration to determine a starting symbol index and a maximum number of symbols for each of the plurality of repetitions of UCI on PUSCH. In one embodiment, the second method includes receiving, from the UE device, UCI on PUSCH that is multiplexed based on the starting symbol index and the maximum number of symbols for each of the plurality of repetitions according to an indicated beta-offset value.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:

at least one memory; and at least one processor coupled with the at least one memory and configured to cause the UE to:

receive a beta-offset value for multiplexing a plurality of repetitions of uplink control information (UCI) on a transmission occasion of a physical uplink shared channel (PUSCH);

determine a starting symbol index and a maximum number of symbols for each of the plurality of repetitions of UCI on the PUSCH;

multiplex the plurality of repetitions of UCI on the PUSCH for transmission of the plurality of repetitions of UCI based on the starting symbol index and the maximum number of symbols for each of the plurality of repetitions of UCI according to the beta-offset value; and receive a table comprising beta-offset values and a corresponding plurality of repetitions of UCI, wherein the table is indexed to enable retrieval, using an index value, of both the beta-offset value and a corresponding number of UCI repetitions for resource determination.

2. The UE of claim 1, wherein the at least one processor is configured to cause the UE to receive a configuration comprising the table for semi-statically configuring the UE with the table.

3. The UE of claim 1, wherein the table is indexed such that only the beta-offset value is accessible from the table using an index value; and wherein the at least one processor is configured to cause the UE to separately one of configure and dynamically indicate to the UE one or more values representing a corresponding number of UCI repetitions for resource determination.

4. The UE of claim 3, wherein different values for the corresponding number of UCI repetitions for resource determination are separately one of configured and dynamically indicated to the UE based on a type of UCI and a priority level of each of the UCI, the UCI type selected from a Hybrid Automatic Repeat Request-Acknowledgement ("HARQ-ACK"), a channel state information ("CSI"), or a configured grant ("CG")-UCI.

5. The apparatus UE of claim 4, wherein the at least one processor is configured to cause the UE to apply repetitions to UCI that has a priority level that satisfies a predefined threshold in response to the UE being one of configured and dynamically indicated to multiplex a plurality of UCIs with at least two different priority levels.

6. The UE of claim 1, wherein the at least one processor is configured to cause the UE to one of configure and dynamically indicate to the UE one or more of a multi-part CSI for multiplexing on PUSCH, a number of UCI repetitions for CSI multiplexing, and a multiplexing pattern between different CSI parts and repetitions.

7. The UE of claim 6, wherein the at least one processor is configured to cause the UE to, for a multi-part CSI repetition on PUSCH, multiplex parts of the multi-part CSI by, for each repetition of CSI, multiplexing CSI parts within resources allocated to that repetition.

8. The UE of claim 6, wherein the at least one processor is configured to cause the UE to, for a multi-part CSI repetition on the PUSCH, multiplex the parts of the multi-part CSI by, for each CSI part, multiplexing repetitions of that CSI part within resources allocated to that CSI part.

9. The UE of claim 8, wherein the at least one processor is configured to cause the UE to configure a separate number of repetitions for different CSI parts to be multiplexed on the PUSCH.

10. A method of a user equipment (UE), comprising:

receiving a beta-offset value for multiplexing a plurality of repetitions of uplink control information (UCI) on a transmission occasion of a physical uplink shared channel (PUSCH);

determining a starting symbol index and a maximum number of symbols for each of the plurality of repetitions of UCI on the PUSCH;

multiplexing the plurality of repetitions of UCI on the PUSCH for transmission of the plurality of repetitions of UCI based on the starting symbol index and the maximum number of symbols for each of the plurality of repetitions of UCI according to the beta-offset value; and receiving a table comprising beta-offset values and a corresponding plurality of repetitions of UCI, wherein the table is indexed to enable retrieval, using an index value, of both the beta-offset value and a corresponding number of UCI repetitions for resource determination.

11. The method of claim 10, further comprising receiving a configuration comprising the table for semi-statically configuring the UE with the table.

12. The method of claim 10, wherein:

the table is indexed such that only the beta-offset value is accessible from the table using an index value; and the method further comprises separately one of configuring and dynamically indicating to the UE one or more values representing a corresponding number of UCI repetitions for resource determination.

13. The method of claim 12, wherein different values for the corresponding number of UCI repetitions for resource determination are separately one of configured and dynamically indicated to the UE based on a type of UCI and a priority level of each of the UCI, the UCI type selected from Hybrid Automatic Repeat Request-Acknowledgement ("HARQ-ACK"), a channel state information ("CSI"), or a configured grant ("CG")-UCI.

14. The method of claim 13, further comprising applying repetitions to UCI that has a priority level that satisfies a predefined threshold in response to the UE being one of configured and dynamically indicated to multiplex a plurality of UCIs with at least two different priority levels.

15. A network equipment (NE), comprising:

at least one memory; and at least one processor coupled with the at least one memory and configured to cause the NE to:

transmit, to a user equipment (UE) a beta-offset value for multiplexing a plurality of repetitions of uplink control information (UCI) on a transmission occasion of a physical uplink shared channel (PUSCH);

transmit, to the UE, a configuration to determine a starting symbol index and a maximum number of symbols for each of the plurality of repetitions of UCI on the PUSCH;

transmit, to the UE, a configuration for semi-statically configuring the UE with a table comprising a plurality of beta-offset values and corresponding plurality of repetitions of UCI, the table indexed such that, using an index value, both a beta-offset value and a corresponding number of UCI repetitions for resource determination are retrievable; and receive, from the UE, UCI on the PUSCH that is multiplexed based on the starting symbol index and the maximum number of symbols for each of the plurality of repetitions of UCI according to an indicated beta-offset value.

16. The method of claim 10, further comprising one of configuring and dynamically indicating to the UE one or more of a multi-part CSI for multiplexing on the PUSCH, a number of UCI repetitions for CSI multiplexing, and a multiplexing pattern between different CSI parts and repetitions.

17. The method of claim 16, further comprising, for a multi-part CSI repetition on the PUSCH, multiplexing parts of the multi-part CSI by, for each repetition of CSI, multiplexing CSI parts within resources allocated to that repetition.

18. The method of claim 16, further comprising, for a multi-part CSI repetition on the PUSCH, multiplexing parts of the multi-part CSI by, for each CSI part, multiplexing repetitions of that CSI part within resources allocated to that CSI part.

19. The method of claim 18, further comprising configuring a separate number of repetitions for different CSI parts to be multiplexed on PUSCH.

20. A method of a network equipment (NE), comprising:

transmitting, to a user equipment (UE) a beta-offset value for multiplexing a plurality of repetitions of uplink control information (UCI) on a transmission occasion of a physical uplink shared channel (PUSCH);

transmitting, to the UE, a configuration to determine a starting symbol index and a maximum number of symbols for each of the plurality of repetitions of UCI on the PUSCH;

transmitting, to the UE, a configuration for semi-statically configuring the UE with a table comprising a plurality of beta-offset values and corresponding plurality of repetitions of UCI, the table indexed such that, using an index value, both a beta-offset value and a corresponding number of UCI repetitions for resource determination are retrievable; and receiving, from the UE, UCI on the PUSCH that is multiplexed based on the starting symbol index and the maximum number of symbols for each of the plurality of repetitions of UCI according to an indicated beta-offset value.

* * * * *